United States Patent [19]

Chmielewski, Jr. et al.

[11] Patent Number: 4,929,843
[45] Date of Patent: May 29, 1990

[54] APPARATUS AND METHOD FOR DETERMINING A DIMENSION OF AN OBJECT

[75] Inventors: Thomas A. Chmielewski, Jr., Southampton Township, Bucks County, Pa.; Richard J. Tarzaiski, Magnolia Borough, Camden County, N.J.

[73] Assignee: General Electric Company, Morrestown, N.J.

[21] Appl. No.: 372,580

[22] Filed: Jun. 28, 1989

[51] Int. Cl.$^5$ .................... G01N 21/86; G01B 11/24; H04N 7/18
[52] U.S. Cl. ............................ 250/561; 250/223 R; 356/376; 358/107
[58] Field of Search ............... 250/561, 560, 236, 235, 250/234, 223 R; 358/107; 382/8, 66, 67; 356/386, 376; 901/7, 47

[56] References Cited

U.S. PATENT DOCUMENTS

| | | | |
|---|---|---|---|
| 3,892,949 | 7/1975 | Dodson | 250/566 |
| 4,063,820 | 12/1977 | Borgese | 250/223 R |
| 4,105,925 | 8/1978 | Rossol et al. | 250/561 |
| 4,155,650 | 5/1979 | Yasue et al. | 250/561 |
| 4,188,544 | 2/1980 | Chasson | 250/560 |
| 4,435,837 | 3/1984 | Abernathy | 250/561 |
| 4,613,942 | 9/1986 | Chen | 250/561 |
| 4,634,328 | 1/1987 | Carrell | 414/117 |
| 4,674,869 | 6/1987 | Pryor et al. | 356/376 |
| 4,677,302 | 6/1987 | Chiu et al. | 250/561 |
| 4,701,047 | 10/1987 | Eibert et al. | 356/376 |
| 4,774,403 | 9/1988 | Arts | 250/561 |
| 4,803,371 | 2/1989 | Durland | 250/560 |

Primary Examiner—David C. Nelms
Assistant Examiner—Michael Messinger
Attorney, Agent, or Firm—William H. Meise

[57] ABSTRACT

The height of an object is determined by projecting a beam of light there across to form a light stripe. A camera views the object obliquely, and forms an image of the light stripe. As a result of the oblique view, the light stripe is imaged as a series of bright vertical lines on a horizontally-scanned image. Each horizontal line scan crosses the light stripe at a particular horizontal position, representative of the height of the object at that point on the image. The projection and imaging optics cause the light stripe to be several pixels wide, so that the height is not exactly known. A logic circuit finds the pixel with the greatest intensity and stores its position and value, and the values of its neighboring pixels. At the end of each line scan, the sum of the stored intensities is formed, together with a weighted sum, so that a ratio may be formed which represents the center position.

21 Claims, 5 Drawing Sheets

APPARATUS AND METHOD FOR DETERMINING A DIMENSION OF AN OBJECT

The Government has rights in this invention pursuant to contract No. 104230-84-D-0929 with the U.S. Postal Service.

BACKGROUND OF THE INVENTION

The invention relates to an apparatus and method for determining the location of a surface of, and more particularly the height of the top surface of unsingulated and possibly overlapping objects.

Automatic singulation, or separation into single items, of odd-shaped parcels, packages, letters, magazines or the like, herein designated mail pieces from a stack of such mail pieces, has been a problem for postal or mail courier services. Postal services and couriers are desirous of, and are at present in the process of converting from manual sorting of mail pieces to mechanized singulation. The problem of mechanical singulation is exacerbated by the odd shapes of many mail pieces, and by the tendency of mail pieces to overlap one another when dumped onto a conveyor.

Some mechanical singulation arrangements rely upon articulated robot arms terminated in end effectors or grippers adapted to pick up one mail piece at a time. Such robot arms may be controlled by a system which determines the location of the package to be picked up. U.S. Pat. No. 4,634,328 issued Jan. 6, 1987 in the name of Carrell describes a singulation system using cameras to determine the profile of the top piece in a pile of unsingulated mail for singulation thereof. U.S. Pat. No. 4,063,820 issued Dec. 20, 1977 in the name of Borgese describes an arrangement for using beams of light directed angularly relative to the surface of an object having a dimension to be measured. In Borgese's scheme, the object sits on a conveyor belt moving at known speed, so that the time lapse between the passage of the object through the beam provides information relating to its dimensions. U.S. Pat. No. 4,803,371 issued Feb. 7, 1989 in the name of Durland describes a system for determining size by the simultaneous use of noncoherent and laser light.

In systems for determining the size of an object in which a laser beam illuminates the object and in which a camera views the illuminated object, the optical limitations of the laser light projector and of the camera optical system cause the light beam as it is imaged onto the photosensitive surface of a camera to be diffused or spread out, possibly over several pixels. The spreading of the image of the laser beam introduces an uncertainty in the exact dimension and location of the mail piece. This inaccuracy, in turn, when translated into commands of a robot arm, may cause the robot arm to grasp the wrong mail piece, or to grasp a mail piece having actual dimensions larger than the measured dimensions in such a manner that the mail piece is damaged by the robot arm. Thus, a method for using one or more laser beams to accurately determine the dimensions, location, or both of a mail piece is desirable.

SUMMARY OF THE INVENTION

A method for determining the centroid of an imaged point includes the step of generating line scan video representative of the point being imaged, in which the point extends over several adjacent pixels in the line scan direction. The method includes the step of storing the magnitude of the historic maximum value of the digital video under the control of a strobe signal. The current value of the digital video is continually compared with the stored historic maximum value, and the strobe is generated only when the current value of the digital video exceeds the stored value, in which case the stored historic value is supplanted or updated to represent the current value upon the occurrence of the strobe. The intensity values of each of selected pixels adjacent to (and which may both precede and follow) that pixel representing the historic maximum intensity are multiplied by a predetermined constant to produce a number of first products, one for each pixel. The first products are summed to produce a sum-of-intensities signal. The intensity values of the selected pixels are also multiplied by selected multipliers, where the selected multipliers have values which are monotonically related to the positions of the associated selected pixel cells relative to the pixel representing the historic maximum, thereby producing second products. The second products are summed to produce a sum-of-weighted intensities signal. At the end of each line scanned, the sum-of-intensities and sum-of-weighted intensities signals are transmitted to a ratio calculator. In response to the beginning of each line scan, pixel-rate counting is initiated. In response to the strobe, the pixel count is stored to produce a position signal representative of a position of the historic maximum pixel along the scan line. At the end of the line scan, the position signal is transmitted together with the other information. In a particular embodiment of the invention, the method for determining the centroid is used for determining the height of an object in conjunction with an arrangement for projecting a stripe of light onto the object and imaging the stripe of light to generate the line scan digital video.

DESCRIPTION OF THE INVENTION

Figure 1:
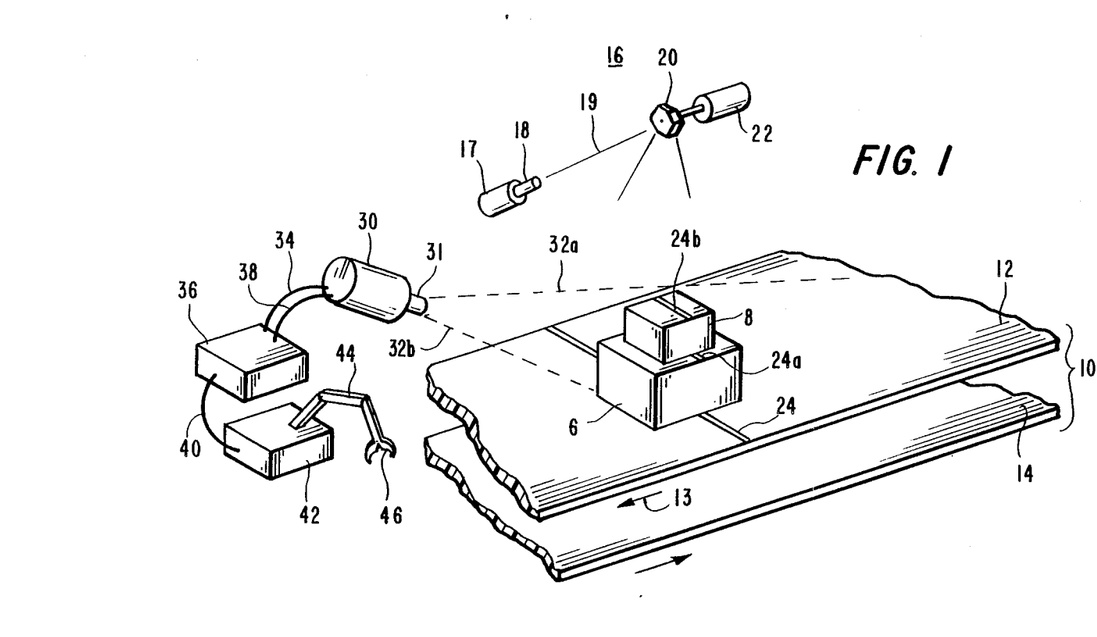
FIG. 1 is a perspective or isometric view of a conveyor conveying unsingulated packages, together with a singulating station including an apparatus for generating a stripe of light and a camera in accordance with the invention.

In FIG. 1, a belt conveyor 10 includes an upper belt 12 for conveying articles and a lower return belt 14. Belt 12 moves in the direction of arrow 13, while belt 14 moves in the reverse direction. As illustrated in FIG. 1, belt 12 bears two packages, a large package 6 which is approximately rectangular in shape, surmounted by a smaller package 8, also approximately rectangular.

As illustrated in FIG. 1, the apparatus includes an arrangement designated generally as 16 for projecting a stripe of light onto the conveyor. The apparatus includes a laser illustrated as 17 which, together with an optical system 18, projects a light beam illustrated as 19 onto a rotating polygonal faceted mirrored "wheel" 20 driven by a motor 22 for recurrently scanning light across the upper surface of conveyor 12 and any parcels which happen to be thereon. Wheel 20 is directly above the center of conveyor belt 12. A preferred embodiment of the invention produces a light stripe by the use of a combination of positive and negative cylindrical lenses.

As illustrated in FIG. 1, the stripe of light projected onto the upper surface of conveyor 12 is designated as 24. As also illustrated in FIG. 1, light protecting apparatus 16 also projects light onto the upper surfaces of packages 8 and the exposed portion of package 6. That portion of light stripe 24 falling on the upper surface of package 6 is designated 24a, and that portion falling on the upper surface of package 8 is designated 24b.

A television camera illustrated as 30 includes an optical or lens system illustrated as 31 which forms an image within a field of view defined by dashed lines 32a and 32b. Analog line scan television signals representative of the image are conveyed over a cable illustrated as 34 to a processing circuit illustrated as a box 36, and ancillary signals such as vertical and horizontal sync and other signals are conveyed from camera 30 to processing box 36 by a cable 38. Processing box 36 processes these signals as described hereinafter to produce, for each line scan, a sum-of-intensities signal, a sum-of-weighted intensities signal, position and other signals such as handshake signals, which are periodically conveyed over a cable illustrated as 40 to a computer and robot controller illustrated together as a block 42, for controlling one or more robot arms illustrated as 44 terminated in end effectors or grippers 46.

Figure 2:
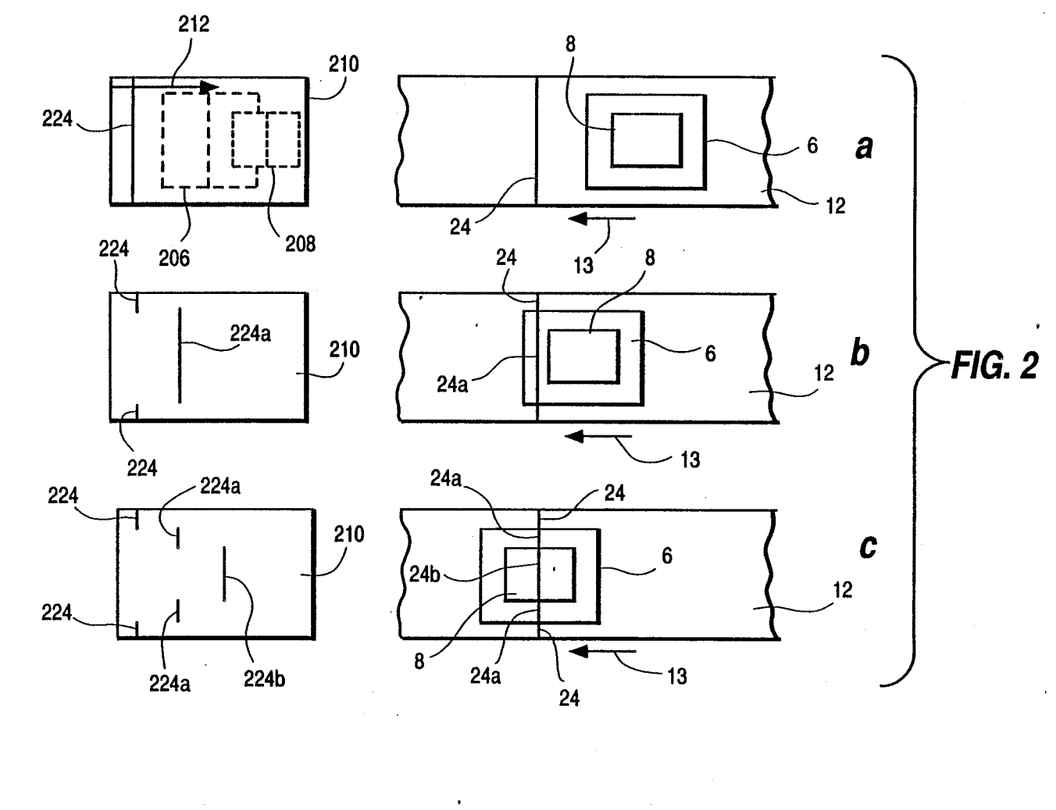
FIGS. 2a, 2b, and 2c each illustrate a plan view of a conveyor with a light stripe and unsingulated packages at different points along the conveyor, together with a representation of the camera image for the particular position.

In operation, unsingulated mail pieces such as packages 6 and 8 are dumped onto conveyer belt 12 at an upstream location and are conveyed past one or more stations at which singulation occurs. Each station may include a light projector apparatus 16 and a camera 30. Packages arrive irregularly at a station along the conveyer belt which is downstream from the point at which the mail pieces are on-loaded. Between times at which a package is at the station, the condition of the conveyer belt 12 may be as illustrated in FIG. 2a.

In FIG. 2a, conveyer belt 12 is shown in plan view, with packages 6 and 8 proceeding in the direction of arrow 13 toward light stripe 24, but not yet arrived at the stripe. FIG. 2a illustrates the corresponding image produced by camera 30. As illustrated in FIG. 2a, camera 30 images a region defined by a border 210, in which the line-scan direction is indicated by an arrow 212, and in which the image 224 of light stripe 24 appears at one side, illustrated as the left side, of imaged region 210. The line scans begin at the top left of "region" 210, recurring at the top left at a television field or frame rate as known in the art and as described, for example, in the text BASIC TELEVISION by Bernard Grob, published by McGraw-Hill. The line-scans recur approximately every 64 microseconds ($\mu S$), and each line scan crosses the image 224 of light stripe 24 once.

The image of packages 6 and 8 does not appear within imaged region 210 of FIG. 2a, because an optical bandpass filter associated with optics 31 passes only light at the wavelength of the laser light and blocks all ambient light. In the absence of such a filter, camera 30 of FIG. 1 would see boxes 6 and 8 as illustrated by dotted outlines 206 and 208 in FIG. 2a.

At a later time, illustrated in FIG. 2b, the leading edge of lower package 6 traverses past light stripe 24, whereupon light stripe 24 in the region of package 6 passes across the upper surface of package 6, thereby producing a raised portion 24a, as illustrated in FIG. 2b. Since camera 30 views the region of interest at an angle, the apparent location of light stripe 24a will move within the imaged region 210, to a position illustrated as 224a. The position of conveyer 12 at the moment that a portion of imaged light stripe 224 moves to the right provides information about the location of the leading edge of package 6 which may be used in determining the exact location of the leading edge of the package, if desired. The deflection of light stripe 224 to the right within imaged region 210 provides information relating to the height of the top surface of the mailpiece or stack of mailpieces. Also, the vertical height of image 224a within imaged region 210 in FIG. 2b provides information about the width of mail piece 6. For purposes of singulation, however, the size or position of package 8 may be more important than that of package 6, since package 8 must be removed first in order to accomplish singulation.

At a later time than that illustrated in FIG. 2b, the stack of packages 6 and 8 moves sufficiently to place the top surface of package 8 under light stripe 24 scanned by wheel 20 of FIG. 1. FIG. 2c illustrates the condition of the conveyer and packages 6 and 8 under this condition. As illustrated in FIG. 2c, the light beam scanned by wheel 20 of FIG. 1 across the upper surface of package 8 produces a raised light stripe 24b, which produces an image 224b deviated farther to the right than images 224a or 224, thereby indicating a greater height for the upper surface of package 8 than for the upper surface of package 6. This information may be used in determining which package has the superior or upper position.

Figure 3:
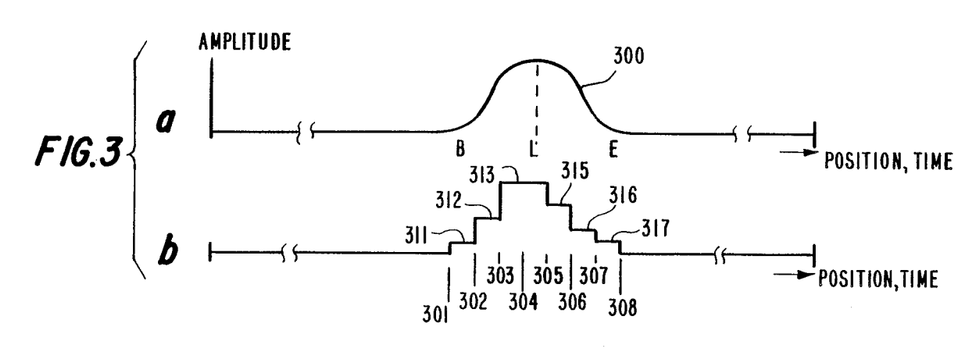
FIGS. 3a and 3b represent analog and digital video representations, respectively, of the intensity or the amplitude of the line scan near the image of the light stripe.

Because of the inherent deficiencies of projection optics 18 of laser 17 and of optics 31 of camera 30, light stripes 24, 24a or 24b when imaged by the camera as 224, 224a or 224b may have widths which extend over several pixels (picture elements). FIG. 3a illustrates a portion of the analog video resulting from a single horizontal scan of imaged region 210 of FIG. 2. In FIG. 3a, the video resulting from a horizontal scan begins at the left at an origin (0), and proceeds to the right along the abscissa with increasing time. In accordance with conventional television practice, the active portion of each horizontal line scan may require approximately 53 microseconds ($\mu S$), with a total recurrence period for each line scan of approximately 64 microseconds, the remaining time being used for horizontal synchronizing and blanking signals. The intensity of the image produced during each horizontal scan is represented in FIG. 3a by the amplitude plotted along the ordinate. Zero amplitude represents a dark image. The amplitude reaches a maximum (bright image) somewhere near the time designated L, but has amplitudes between zero and a maximum within times extending from the beginning B to the end E of the time period. From point E to the rightmost portion of the line scan, the amplitude is again near zero. While the analog curve 300 appears smooth and symmetrical, it may be difficult to establish the exact time at which it "occurs", and therefore difficult to determine the location of the light stripe represented thereby. Conventional thresholding techniques are subject to noise, intensity changes, bias level errors, and the like which tend to reduce accuracy.

Ordinarily, signal processing may be performed more conveniently in time and amplitude quantized digital form rather than in analog form. Conventional television practice uses 8 binary digits or digital bits to represent the amplitude or intensity of the analog video. Eight bits, when organized into a word, can convey information representing the analog amplitude quantized into one of about 256 independent levels. FIG. 3b is similar to FIG. 3a, illustrating a simplified digital representation of the analog information of FIG. 3a. In FIG. 3b, the digital information is quantized and digitized in such a manner that a first digital value 311 occurs during the pixel-representative interval lying between times 301 and 302, a second level 312 occurs during the pixel-representative interval between times 302 and 303, a level 313 occurs during two successive pixel intervals, extending from time 303 to time 305, another, lesser level 315 is represented in the interval 305–306, a sixth pixel interval extending between times 306 and 307 has a value represented by 316, and the seventh pixel, having a value represented by level 317, occurs during the interval extending from time 307 to time 308. As in the case of analog curve 300, it may be difficult to establish the exact center of the curve represented by the digital values.

Figure 4:
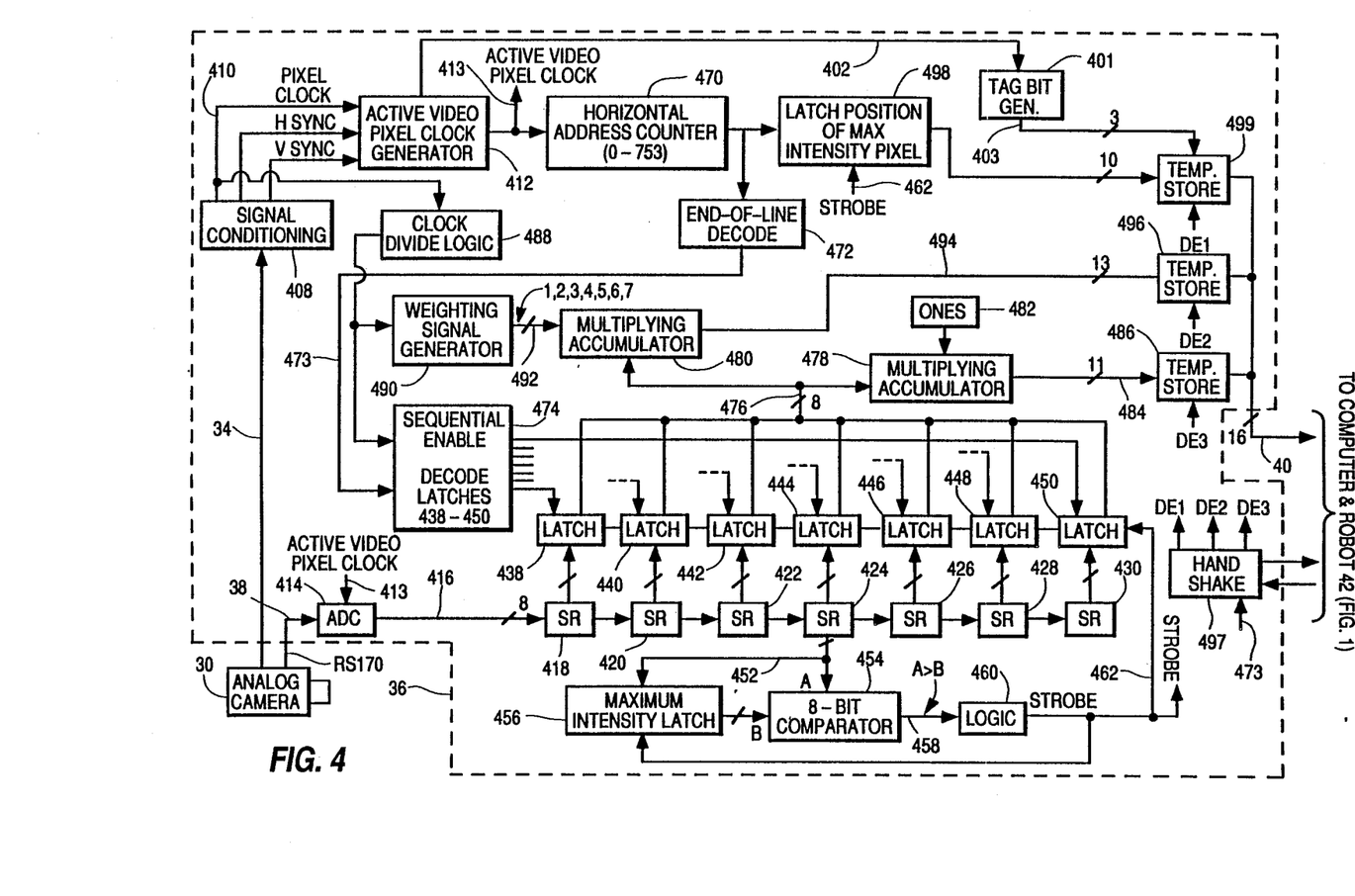
FIG. 4 is a simplified block diagram of a portion of an arrangement for determining a centroid.

FIG. 4 is a simplified block diagram illustrating camera 30 of FIG. 1 and also illustrating certain details of processing circuit 36. As illustrated in FIG. 4, signals appurtenant to the video signal, such as horizontal sync, vertical sync and the like are applied over a cable 34 to a signal conditioning circuit illustrated as a block 408, which generates a pixel rate clock on a conductor 410 for application, together with vertical (V) and horizontal (H) sync signals, to an active video pixel clock generating circuit illustrated as a block 412. Block 412 processes the pixel clock from conductor 410 to produce 754 clock pulses on a conductor 413 during each active video interval, and no pulses during periods between active video intervals. The analog video signal produced on cable 38 by analog camera 30 is applied to an analog-to-digital converter (ADC) 414, which also receives active video pixel-rate clock signals over conductor 413 from generating circuit 412 for quantizing and digitizing the analog video to produce digital Video on a conductor set 416 at the pixel clock rate.

Conductor set 416 applies the digital video to a cascade of 7 shift registers (SR) 418, 420, 422, 424, 426, 428, and 430. The output of each shift register is applied to the input of the succeeding shift register, so that the digital video signals are applied sequentially to each shift register in turn, with the progress from one shift register to the next being at the pixel clock rate.

At each pixel clock pulse, the video signal produced by ADC 414 represents the brightness or intensity of a particular pixel. Thus, the value of the video intensity stored in a shift register represents the intensity of a pixel. The value of the video intensity of a pixel is often itself referred to as a pixel. For simplicity, this terminology is used hereinafter, except where otherwise indicated.

The signal currently stored in each register 418–430 (where the hyphen represents the word through) is made available to the input of one of seven corresponding latches 438, 440, 442, 444, 446, 448 and 450. Center register 424 has three shift registers 418, 420, and 422 preceding it and three further shift registers 426, 428, and 430 following. Consequently, at any particular time, the sample of video then contained in shift register 424 may be considered to be the "center" or reference pixel of a sequence of seven pixels, three of which are older or to the right of the center pixel in the horizontal line scan, and three of which are newer or to the left. It should be noted that in the structure of FIG. 4, the older pixels are stored in the shift registers to the right of center shift register 424, namely shift registers 426, 428 and 430, with the pixel stored in shift register 430 being the oldest. Similarly, the pixels stored in shift registers 418, 420 and 422 are newer or of more recent origin than the center or reference pixel stored in center shift register 424, with the pixel currently stored in shift register 418 being the newest.

The center pixel currently stored in shift register 424 is considered the current pixel, and it is made available over a conductor illustrated as 452 to an eight-bit comparator 454, which compares the value of the pixel then stored in shift register 424 with the value of the pixel stored in a maximum intensity latch 456. The value stored in latch 456 is the value of that pixel which at some previous time was determined to have the maximum intensity. When the current pixel exceeds the pixel stored in latch 456, a signal is produced by comparator 454 on a conductor 458 for application to a logic circuit 460 which acts as a gate to produce a strobe signal only during the active video scan interval. The strobe signal produced by logic circuit 460 is applied over a conductor 462 to an input of maximum intensity latch 456 for latching the value of the current pixel by overwriting the value of the previous maximum intensity pixel. The strobe signal is also applied from logic circuit 460 over conductor 462 to latches 438, 440, 442, 444, 446, 448, and 450 for enabling the latches for storing the current values of the center pixel and the six adjacent pixels, three on each side of the center pixel. Upon the occurrence of the strobe on conductor 462, therefore, latch 438 latches the value of the newest pixel then stored in register 418, latch 440 stores the value of the next youngest pixel then stored in register 420, and latch 442 stores the value then stored in register 422. Similarly, latch 446 latches the value of the antepenultimate pixel then stored in register 426, latch 448 latches the value of the penultimate pixel then stored in register 428, and latch 450 latches the value of the oldest pixel stored in register 430.

In operation, registers 418-430, latches 438-450, and maximum intensity latch 456 are all cleared at the beginning of each horizontal line scan. Thereafter, during the horizontal line, the incoming digital video will include values, some of which relate to noise. Due to optical reflections and the like, more than one lighted feature may appear in the image being scanned, but the amplitude of extraneous light should be relatively small. At the onset of the scanning of any significant feature of the image, the values of the current pixel will begin to increase as the scan of the feature progresses. As the values increase, each current pixel will be compared with the previous pixel, and in general will have a greater magnitude. Thus, the scanning of the first half of the first significant feature of any image will result in a succession of strobe signals on conductor 462, which will cause sequential storing in maximum-intensity latch 456 of the values of the center pixels. For example, referring to FIG. 3b, during the time interval 301–302, maximum intensity latch 456 of FIG. 4 will store level 311, during the interval 302–303 comparator 454 will compare level 312 with the stored level 311, and produce a strobe signal which causes level 312 to be over-written in maximum intensity latch 456 over the previously stored level 311. Similarly, during time interval 303–304, level 313 of FIG. 3b will be compared with the stored level 312, and a strobe signal will again be produced to thereby store level 313. However, during time interval 304–305, level 313 will again be compared with the stored level 313, and comparator 454 of FIGURE 4 will not produce a strobe signal, because level 313 is not greater than itself. Consequently, the level stored in maximum intensity latch 456 of FIG. 4 will be level 313 of FIG. 3b. During succeeding intervals, namely intervals 305–306, 306–307 and 307–308, and all succeeding pixel intervals until the end of the horizontal scan, the levels such as levels 315, 316, 317 and zero level will be compared with level 313 and will be found to be smaller. Consequently, no strobe signal will be produced by logic circuit 460 of FIG. 4 at times following time 304. Thus, level 313 will remain stored in maximum intensity latch 456 until the end of the horizontal scan. Also, latches 438–450 will store the values which the center pixel and the six surrounding pixels had at the moment that the last strobe occurred.

In FIG. 4, a horizontal address counter 470 is cleared by a signal related to horizontal sync and begins to count active video pixel clock signals at the beginning of the active portion of each horizontal line. Thus, at any particular moment the count of counter 470 can represent the position of the current pixel stored in shift register 424. Since counting begins before a pixel reaches shift register 424 after the beginning of each line, the difference between the actual pixel in register 424 and the pixel count is four pixel intervals. If this four-pixel-clock error creates problems, counter 470 may be preset to a value of −4 at the beginning of the active scan, so that the count represents the actual pixel currently in shift register 424. However, this is an error which can be corrected by simple physical alignment or by correction in algorithms described below, and which may therefore not be particularly important. The full count of counter 470 may be 753 at the end of a horizontal line, although the counter may be capable of a greater number of counts.

The time at which the horizontal line scan ends is identified by an end-of-line decoder 472 which is coupled to counter 470. At the end of each horizontal scan, decoder 472 produces a signal which triggers a sequential enable decoder 474 which, is driven by a subharmonic of the pixel clock generated by divide clock logic 488, sequentially enables reading of latches 438 through 450. These seven pixel clock subharmonic signals define a succession of decode intervals which occur during horizontal retrace rather than during active scan time. Thus, during the first decode interval following the end of each horizontal line, latch 438 is enabled for reading, and its contents are read over a conductor set 476 to a first multiplying accumulator 478 and to a second multiplying accumulator 480. Multiplying accumulator 478 multiplies the signal received from latch 438 by unity, which is supplied by a ones generator 482, and stores the product as a partial sum. During the second decode interval following the end of the horizontal line, sequential enable decoder 474 enables latch 440 for reading, and the value so read is applied to multiplying accumulator 478, where the value is multiplied by one and the product is summed with the previous partial sum from latch 438. The sequential reading of the latches proceeds, with the multiplication by unity of the value read from each latch in turn and summing of the products until, at the end of the seventh decode interval following the end of the horizontal line, multiplying accumulator 478 includes the sum of the values stored in all of latches 438 through 450. Since these values represent the intensity or brightness of the video signal, the sum values stored in multiplying accumulator 478 may be termed a sum-of-intensities signal. The sum-of-intensities signal is made available by a conductor set 484 to a temporary store 486, where it is held until ordered to transmit.

Clock divide logic 488 also provides signals which are applied to a weighting signal generator 490. The weighting signal has a particular value which is monotonically related to the position of the pixel stored in the latch currently being read relative to the center pixel. For example, when latch 438 is being read and the signal is being applied to multiplying accumulator 480, weighting signal generator 490 produces a unity weighting signal. Multiplying accumulator 480 multiplies the weighting signal of unity by the value then being read from latch 438 to produce a partial sum which is accumulated in multiplying accumulator 480. During the next decode interval, when latch 440 enabled by enable decoder 474 for being read, weighting signal generator produces a weighting signal equal to two. Multiplying accumulator 480 multiplies the value read from latch 440 by two to produce a weighted product, and accumulates the weighted product with the previous weighted product. During the third decode interval following the end of the horizontal scan or horizontal line, sequential enable decoder 474 enables latch 442 for reading, and the stored value read from latch 442 is applied over conductor 476 to multiplying accumulator 80. At the same time, weighting signal generator 490 produces a weighting signal having a value of three. Multiplying accumulator 480 multiplies the value read from latch 442 by three to produce a partial sum, and accumulates the partial sum with the previous partial sums. During the fourth decode interval pulse following the end of each horizontal line, the value then stored in center-pixel latch 444 is read, and weighting signal generator 490 produces a weighting signal having a value of four. Multiplying accumulator 480 multiplies the signal read from latch 444 by four to produce the partial sum, and accumulates the partial sums together with the other partial sums. This process continues until, during the seventh decode interval following the end of each horizontal scan, the value then stored in latch 450 is applied to multiplying accumulator 480 together with a weighting signal having a value of 7, whereupon multiplying accumulator 480 multiplies the value from latch 450 by 7 and accumulates the partial sum so formed with the other six partial sums to produce a final value representing the total of all the partial products. The total is applied over a conductor 494 to a temporary store 496. The signal at the output of multiplying accumulator 480 is the sum of weighted products, and may be termed a sum-of-weighted intensities signal. Temporary store 496 stores the sum-of-weighted intensities signal.

The strobe signal produced by logic circuit 60 on conductor 462 is also applied to a latch 498. Latch 498 is coupled to the output of horizontal address counter 470, and at the occurrence of each strobe signal, latches the value then produced by counter 470 by overwriting the previously stored value. Since the strobe signal occurs at the moment of the maximum intensity pixel, latch 498 at the end of each horizontal line stores a count representative of the position of the maximum intensity pixel. The position-representative signals stored in latch 498 are made available to a temporary store 499. The position signal is temporarily stored in store 499.

A handshake logic circuit illustrated as 497 receives end-of-line decode signals over conductor 473 and interfaces with computer and robot circuit 42 of FIG. 1 for generating handshake signals and for sequentially enabling temporary store 499, 496 and 486 to communicate the position-representative signals, the sum-of-weighted intensities signal and the sum-of-intensities signals over conductor 40 to computer and robot 42.

A tag bit generator 401 is coupled by a data path 402 to active video pixel clock generating circuit 412 for receiving therefrom synchronization information relating to the location in the field of the horizontal line currently being processed, and whether the field is odd or even, so that the relationship of the information stored in temporary stores 486, 496 and 499 can be meaningfully processed. For example, it may be desired to process data only from odd (or even) fields to prevent even/odd field distortion from affecting the results. Tag bit generator 401 sets three bits identifying (a) even/odd field, (b) the first line of valid video data, i.e., beginning of active field, and (c) vertical retrace period. The tag bits are made available over a data path 403 to temporary store 499. Temporary store 499 stores the tag bits as most significant bits to the 10 bits of lesser significance needed to store the count from latch 498, making a total of 13 bits. Output data path 40 has a 16-bit capacity and can carry the additional information to computer and robot 42.

Computer and robot 432 of FIG. 1 calculates the centroid $X_c$ of the intense portion of each horizontal line $$X_c = \frac{\sum_{i=0}^{N} W_i I_i}{\sum_{i=0}^{N} I_i} \quad (1)$$

where $I_i$ is the intensity at any pixel i; and
$W_i$ is the weight accorded the physical location of pixel i.

As described above, seven pixels are processed, namely the central pixel, and three pixels preceding and following the central pixel. The location $L_{xc}$ of the centroid of the line may be written as $$L_{xc} = \left[ \frac{\sum_{i=1}^{7} W_i I_i}{\sum_{i=1}^{7} I_i} - K \right] + MIA \quad (2)$$

where $I_i$ and $W_i$ are defined as above;
K is a constant which compensates for the bias of the weighting sequence, and equals the average of all seven $W_i$: for $W_i=1, 2...7$ the value of K is 4; and
MIA is the address along each horizontal line at which the maximum intensity pixel occurs.

The bracketed portion of equation (2) represents the fractional pixel portion of the centroid and may be positive or negative. MIA represent in integer pixel form the uncorrected position of the most intense pixel, corrected, if necessary, to take into account the difference, discussed above, between the actual pixel stored in register 424 and the pixel count.

Figure 5:
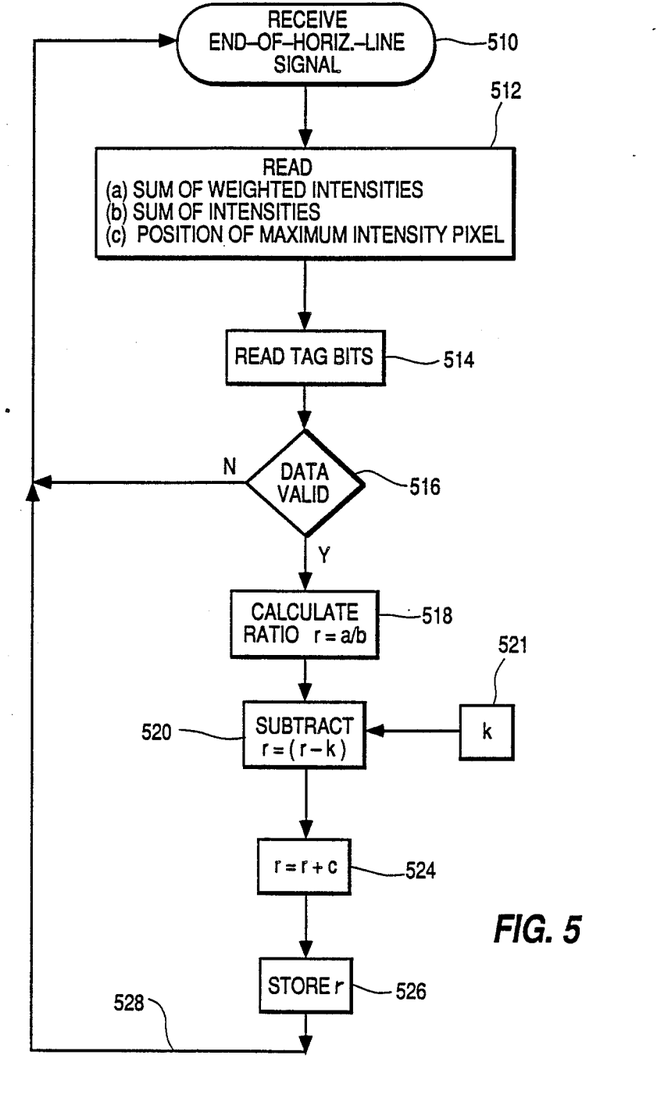
FIG. 5 is a flow chart representing the process for determining the height of the stripe and for determining the location of the objects.

FIG. 5 is a flow chart representing the flow of information in computer and robot 42 to perform equation (2). In FIG. 5, processing begins at a block 510 with receipt of an end-of-horizontal-line signal. The logic flows to a block 512 which represents the sequential reading of data from temporary stores 486, 496 and 499 of FIG. 4, although not necessarily in that order. The tag bit information is read in a block 514 and is examined for data validity in a decision block 516. If the data in not valid, no further execution is performed, and the system returns to block 510 to await the next end-of-horizontal-line signal. If the data is valid, the logic flows by the Y output of decision block 516 to a block 518, representing the calculation of r, the ratio of a, the weighted sum-of-intensities, divided by b, the sum-of-intensities. Ratio r flows to a block 520, which also receives a stored value K from an internal memory represented as a block 522. A subtraction is performed, $r=r-K$. The logic then flows to a block 524, in which the integer pixel position of the maximum intensity pixel, designated c, is added to r. The value of r thus computed is the position of the maximum intensity of the horizonal line in question. The value of r is stored for further use in a block 526, and the logic returns by a path 528 to block 510 to await another end-of-horizontal line signal.

Other embodiments to the invention will be apparent to those skilled in the art. In particular, the weighting signal produced by weighting signal generator 490 of FIG. 4 need only be monotonically related to the position of the pixel the value of which it multiplies, relative to the center pixel. Thus, the weighting signal sets may have values such as −3, −2, −1, 0, 1, 2, 3 or 701, 702, 703, 704, 705, 706, and 707. Alternatively, the weighting signal could have values 210, 220, 230, 240, 250, 260, and 270. Also, there is no reason that the weighting signals must increase monotonically, but they may instead decrease monotonically, the same result being obtained. Further, a simple accumulator may be used instead of multiplying accumulator 478 and ones generator 482. A scaling factor may be introduced by changing the multiplying factor for multiplying accumulator 478, as by changing ones generator 482 to an N-generator, where N is any constant. The strobe signal could also be generated when the current pixel value equals or exceeds the historic maximum rather than only when it exceeds the value.

What is claimed is:

1. A method for determining the centroid of an imaged feature, comprising the steps of:
   generating line scan digital video representative of the feature, in which said feature extends over several adjacent pixels in the line scan direction;
   storing the magnitude of the historic maximum value of said digital video under the control of a strobe;
   continually comparing a current value of said digital video with the stored historic maximum value, and generating said strobe when said current value exceeds said stored historic value, whereby said stored historic value is updated to represent the current value at the occurrence of each strobe;
   multiplying the values of each of selected pixels of said digital video by a predetermined constant to produce first products, and summing said first products to produce a sum-of-intensities signal, said selected pixels being adjacent that pixel representing said historic maximum;

multiplying said values of each of said selected pixels by a selected multiplier to thereby produce second products, the values of said selected multipliers being monotonically related to the positions of the associated selected pixels, and summing said second products to produce a sum-of-weighted intensities signal; and transmitting said sum-of-intensities and sum- o of-weighted intensities signals to a ratio calculator;

in response to the beginning of each said line scan, initiating pixel-rate counting;

in response to said strobe, storing the count resulting from said pixel-rate counting, to produce a position signal representative of the position of the pixel at which said historic maximum occurs; and transmitting said position signal representing the position of the pixel at which historic maximum value occurs.

2. A method according to claim 1 wherein said steps of multiplying the values and multiplying said values are performed following the end of each line scan, and at least one of said transmitting steps follows said multiplying steps.

3. A method according the claim 1 further comprising the step of clearing all stored memory at the beginning of each scan line.

4. A method according to claim 1 wherein said selected pixels in said multiplying steps are the N adjacent pixels on each side of said pixel representing said historic maximum value, where N is an integer.

5. A method according to claim 4, where N is three.

6. A method according to claim 4, wherein said multipliers have values which begin with a reference value for the Nth pixel to one side of said pixel representing said historic maximum value, the value of said multipliers incrementing by unity for each pixel closer, on said one side, to said pixel representing said historic maximum.

7. A method according to claim 1, in which said generating step includes the steps of:

generating line-scan analog video representative of said point; and analog-to-digital converting said analog video to form said digital video.

8. A method for determining the height of a surface of an object, comprising the steps of:

projecting a stripe of light onto the object;

imaging said stripe of light projected onto said object to generate line-scan digital video in which each line-scan crosses the image of said stripe whereby the stripe appears in each said line-scan as a significant value extending over several pixels;

storing the magnitude of the historic maximum value of said digital video under the control of a strobe;

continually comparing a current value of said digital video with the stored historic maximum value, and generating said strobe only when said current value exceeds said stored historic value, whereby said stored historic value is updated to represent the current value at the occurrence of each strobe;

multiplying the values of each of selected pixels of said digital video by a predetermined constant, which may be unity, to produce first products, and summing said first products to produce a sum-of-intensities signal, said selected pixels being adjacent that pixel representing said historic maximum;

multiplying said values of each of said selected pixels by a selected multiplier to produce second products, the values of said selected multipliers being monotonically related to the relative positions of the associated selected pixels, and summing said second products to produce a sum-of-weighted intensities signal; and transmitting said sum-of-intensities and sum-of-weighted intensities signals to a ratio calculator;

in response to the beginning of each said line scan, initiating pixel-rate counting;

in response to said strobe, storing the count resulting from said pixel-rate counting to produce a position signal representative of the position of the pixel at which said historic maximum occurs; and transmitting said position signal representing the position of the pixel at which historic maximum value occurs.

9. A method according to claim 8, wherein said selected pixels in said multiplying steps are the N adjacent pixels on each side of said pixel representing said historic maximum value, where N is an integer.

10. A method according to claim 9, where N is three.

11. A method according to claim 9, wherein said multipliers have values which begin with a reference value for the Nth pixel to one side of said pixel representing said historic maximum value, the values of said multipliers incrementing by unity for each pixel closer, on said one side, to said pixel representing said historic maximum.

12. A method according to claim 8, in which said generating step comprises the steps of generating line-scan analog video representation of said line; and analog-to-digital converting said analog video to form new digital video.

13. A method according to claim 8, wherein both said multiplying steps are performed after the end of each line scan.

14. A method according to claim 13, wherein both said transmitting steps are performed after the end of each line scan.

15. An apparatus for determining the height of an object, comprising:

means for projecting a stripe of light onto said object, imaging means directed toward said object for generating a stream of line-scan digital video in which said stripe is imaged as a feature extending over several pixels;

delay means coupled to said imaging means for making simultaneously available a plurality of sequential samples of said digital video, including a reference pixel;

maximum intensity storage means coupled to said delay means for receiving receive samples of said digital video associated with said reference pixel for, in response to a strobe signal, storing as the value of a maximum intensity pixel, the value of said reference pixel which is current at the time of said strobe signal;

comparison means coupled to said delay means and to said maximum intensity storage means for comparing the current value of said reference pixel with the value of said maximum-intensity pixel for generating said strobe signal in response to the value of said current pixel exceeding the value of said maximum-intensity pixel;

second storage means coupled to said delay means and to said comparison means for, in response to said strobe signal, storing the values of said plurality of sequential samples of digital video;

clock means coupled to said imaging means and responsive to the beginning of each said line-scan for producing a count signal representative of the position of the current pixel;

third storage means coupled to said clock means and to said comparison means for storing said count signal in response to said strobe signal;

first means coupled to said second storage means for, at the end of each said line-scan, multiplying the values then stored in said second storage means by a constant, which may be unity, to produce a plurality of first products, and for summing said first products to form a sum-of-intensities signal;

multiplying means coupled to said second storage means for, at said end of each said line-scan, multiplying the values then stored in said second storage means by a constant related to the position of the pixel which it represents relative to said reference pixel, to produce a plurality of second products, and summing said second products to form a sum-of-weighted intensities signal; and transmitting means coupled to said third storage means, to said first means and to said multiplying means for transmitting to further processing means said count signal representative of the position of said reference pixel, said sum-of-intensities and said sum-of-weighted intensities signals.

16. An apparatus according to claim 15 wherein said imaging means comprises:
   an analog camera for producing a stream of analog video and horizontal sync signals;
   a pixel-rate clock; and
   analog-to digital conversion means coupled to said analog camera and to said pixel-rate clock for converting said analog video to said digital video at a pixel rate.

17. An apparatus according to claim 16 wherein said clock comprises horizontal address counting means coupled to said camera for responding, at least in part, to said horizontal sync signal for resetting said horizontal address counting means and for beginning counting at said pixel rate at the beginning of each horizontal line.

18. An apparatus according to claim 15 wherein said delay means comprises a plurality of shift registers, for shifting said digital video therethrough at the pixel rate.

19. An apparatus according to claim 18 wherein said second storage means comprises a plurality of latches, each coupled to one of said shift registers for, at the occurrence of said strobe signal, latching the value then stored in said shift register.

20. An apparatus according claim 19 wherein said first multiplying means comprises enable means responsive to the end of each line-scan for generating a sequence of N signals for individually reading each of said plurality of latches.

21. An apparatus according to claim 20 wherein said second multiplying means comprises sequence generating means coupled to said enabling means for sequentially generating constants having values monotonically related to the position of the enabled latch relative to that latch storing said reference pixel.

* * * * *